(12) United States Patent
Troia et al.

(10) Patent No.: US 9,758,253 B2
(45) Date of Patent: Sep. 12, 2017

(54) SWEPT GRADIENT BOUNDARY LAYER DIVERTER

(71) Applicant: NORTHROP GRUMMAN SYSTEMS CORPORATION, Falls Church, VA (US)

(72) Inventors: Trajaen J. Troia, Hermosa Beach, CA (US); John F. Mangus, Brea, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 224 days.

(21) Appl. No.: 14/750,718

(22) Filed: Jun. 25, 2015

(65) Prior Publication Data

US 2016/0376018 A1  Dec. 29, 2016

(51) Int. Cl.
*B64D 33/02* (2006.01)
*B64C 21/10* (2006.01)
(Continued)

(52) U.S. Cl.
CPC .............. *B64D 33/02* (2013.01); *B64C 21/10* (2013.01); *B64C 23/04* (2013.01); *B64C 23/06* (2013.01);
(Continued)

(58) Field of Classification Search
CPC .............. B64D 33/02; B64D 2033/026; B64D 2033/0226; B64C 23/06; Y02T 50/166
(Continued)

(56) References Cited

U.S. PATENT DOCUMENTS

| 2,970,431 A | * | 2/1961 | Harshman | F02C 7/042 137/15.1 |
| 3,066,892 A | * | 12/1962 | Smith | F02C 7/042 244/53 B |

(Continued)

FOREIGN PATENT DOCUMENTS

| CN | 102249004 A | 11/2011 |
| RU | 2 517 629 C1 | 5/2014 |
| WO | 2008/017567 A1 | 2/2008 |

OTHER PUBLICATIONS

Saheby, Eiman B. et al. "A Novel Aerodynamic Surface for Redirecting the Boundary Layer" American Institute of Aeronautics and Astronautics, 17 pgs.

*Primary Examiner* — Brian M O'Hara
*Assistant Examiner* — Keith L Dixon
(74) *Attorney, Agent, or Firm* — John A. Miller; Miller IP Group, PLC

(57) ABSTRACT

A swept gradient air boundary layer diverter for an aircraft. The aircraft includes a fuselage and an air inlet for an engine of the aircraft, where the air inlet includes a cowl at a leading edge of the inlet. The diverter includes a V-shaped ramp portion formed in the fuselage in an area proximate to and in front of the cowl where the ramp portion extends downward away from an outer surface of the fuselage towards an inside of the aircraft. The diverter also includes a V-shaped trough portion formed into the fuselage and being positioned adjacent to and integral with the ramp portion between the ramp portion and the air inlet. Air flowing over the fuselage towards the cowl is expanded and compressed by the ramp portion and the trough portion so as to create pressure gradients that generate vortices to redirect boundary layer airflow around the air inlet.

24 Claims, 4 Drawing Sheets

(51) Int. Cl.
*B64C 23/06* (2006.01)
*B64C 23/04* (2006.01)
*B64D 47/08* (2006.01)

(52) U.S. Cl.
CPC ........ *B64D 47/08* (2013.01); *B64D 2033/026* (2013.01); *B64D 2033/0226* (2013.01); *Y02T 50/162* (2013.01); *Y02T 50/166* (2013.01)

(58) Field of Classification Search
USPC .................................................. 244/53 B, 36
See application file for complete search history.

(56) References Cited

U.S. PATENT DOCUMENTS

| | | | |
|---|---|---|---|
| 3,532,305 A | 10/1970 | Madelung | |
| 3,578,265 A | 5/1971 | Patierno et al. | |
| 5,490,644 A | 2/1996 | Koncsek et al. | |
| 5,749,542 A | 5/1998 | Hamstra et al. | |
| 5,775,643 A * | 7/1998 | McMaster | F41G 7/2293 244/1 R |
| 5,779,189 A * | 7/1998 | Hamstra | B64C 7/00 137/15.1 |
| 6,527,224 B2 | 3/2003 | Seidel | |
| 6,575,406 B2 * | 6/2003 | Nelson | B64C 1/0009 244/119 |
| 6,793,175 B1 | 9/2004 | Sanders et al. | |
| 7,207,520 B2 * | 4/2007 | Lundy | G06F 17/5095 137/15.2 |
| 7,520,470 B2 | 4/2009 | Lucchesini et al. | |
| 7,568,347 B2 | 8/2009 | Leland et al. | |
| 7,637,455 B2 | 12/2009 | Silkey et al. | |
| 7,690,595 B2 | 4/2010 | Leland et al. | |
| 7,861,968 B2 | 1/2011 | Parikh et al. | |
| 7,866,599 B2 * | 1/2011 | Elvin | B64C 30/00 244/53 B |
| 7,967,241 B2 | 6/2011 | Chase et al. | |
| 7,975,961 B2 | 7/2011 | Silkey et al. | |
| 8,256,706 B1 | 9/2012 | Smith et al. | |
| 8,292,217 B2 | 10/2012 | Smith et al. | |
| 8,297,058 B2 | 10/2012 | Leland et al. | |
| 8,544,799 B2 * | 10/2013 | Da Silva | B64C 23/06 244/130 |
| 8,684,302 B2 | 4/2014 | Chanez et al. | |
| 8,690,097 B1 | 4/2014 | Huynh | |
| 9,051,057 B2 * | 6/2015 | Da Silva | B64D 41/00 |
| 9,284,046 B2 * | 3/2016 | Lucchesini | B64C 1/0009 |
| 2007/0181743 A1 | 8/2007 | Klinge et al. | |
| 2009/0052478 A1 | 2/2009 | Vassberg et al. | |

* cited by examiner

SWEPT GRADIENT BOUNDARY LAYER DIVERTER

BACKGROUND

Field

This invention relates generally to an air boundary layer diverter for an aircraft and, more particularly, to a swept gradient air boundary layer diverter for a supersonic aircraft that includes a V-shaped swept expansion and compression ramp and diverter trough positioned in front of an engine inlet of the aircraft.

Discussion

Some modern aircraft must have the capability to operate at supersonic speeds, i.e., above Mach 1, which requires the aircraft to be highly aerodynamic and relatively low weight. In order to operate at supersonic speeds, the engines of such aircraft require a relatively large air inlet, where a typical air inlet for a supersonic aircraft will include a specially shaped leading edge, sometimes referred to as a cowl, and/or compression ramps that reduce the speed of the airflow into the engine to be suitable for proper operation of the engine. The design of these types of air inlets is challenging for aerodynamic operation.

For an aircraft in free flight, a low velocity, low pressure boundary layer of air builds up on the fuselage of the aircraft. The air boundary layer is generated as a result of friction forces on the aircraft fuselage, where air immediately adjacent to the fuselage has a zero velocity and as the distance from the fuselage increases, the velocity of the air also increases as determined by the speed of the aircraft. As the distance from the fuselage increases, the pressure forces of the airflow overcome the friction effect of the fuselage, where at some distance from the aircraft, the airflow becomes a free stream. If this low speed air boundary layer is ingested into the engine air inlet, the engine can encounter operability issues, such as a surge or stall, due to distortion levels beyond the engine's limitations, or rotating machinery high cycle fatigue issues due to increased distortion levels. Ingested boundary layer airflow also reduces the engine thrust and efficiency, which results in a reduced speed of aircraft operation.

In order to overcome these issues caused by the air boundary layer, it is known in the art to design supersonic aircraft with an air boundary layer diverter that prevents the boundary layer air from entering the engine air inlet. A traditional air boundary layer diverter on a supersonic aircraft includes a slot formed between the aircraft fuselage and the air inlet through which the boundary layer air flows, instead of flowing into the inlet. The width of the slot is selectively designed so that the inside edge of the cowl is at a location where only the free air steam is occurring. Such air boundary layer diverters have been shown to be effective in preventing the boundary layer air from entering the air inlet, but they reduce aircraft performance as a result of having a larger aircraft cross-sectional area that increases aircraft drag. Further, the airflow of the boundary layer is directed around the cowl, which often causes this air to impact various structures that are required to incorporate the slot diverter, which also increases drag.

SUMMARY

The present disclosure describes a swept gradient air boundary layer diverter for an aircraft. The aircraft includes a fuselage and an air inlet for an engine of the aircraft, where the air inlet includes a cowl at a leading edge of the inlet. The diverter includes a V-shaped ramp portion formed in the fuselage in an area proximate to and in front of the cowl, where the ramp portion extends downward away from an outer surface of the fuselage towards an inside surface of the aircraft. The diverter also includes a V-shaped trough portion formed into the fuselage and being positioned adjacent to and integral with the ramp portion between the ramp portion and the air inlet. Air flowing over the fuselage towards the cowl is expanded and compressed by the ramp portion and the trough portion so as to create pressure gradients that generate vortices that redirect boundary layer airflow away from and around the air inlet. In alternate embodiments, the swept gradient diverter can redirect airflow around other aircraft or vehicle systems requiring boundary layer flow control for performance and efficiency purposes, such as visual devices and auxiliary air intakes.

DETAILED DESCRIPTION OF THE EMBODIMENTS

The following discussion of the embodiments of the invention directed to a swept gradient air boundary layer diverter for a supersonic aircraft is merely exemplary in nature, and is in no way intended to limit the invention or its applications or uses. For example, the discussion herein of the swept gradient air boundary layer diverter includes reference to specific aircraft and reference to an engine air inlet. However, as will be appreciated by those skilled in the art, the swept gradient air boundary layer diverter of the invention will have application to many other types of subsonic, supersonic and hypersonic aircraft, and for other applications other than engine inlet applications.

Figure 1:
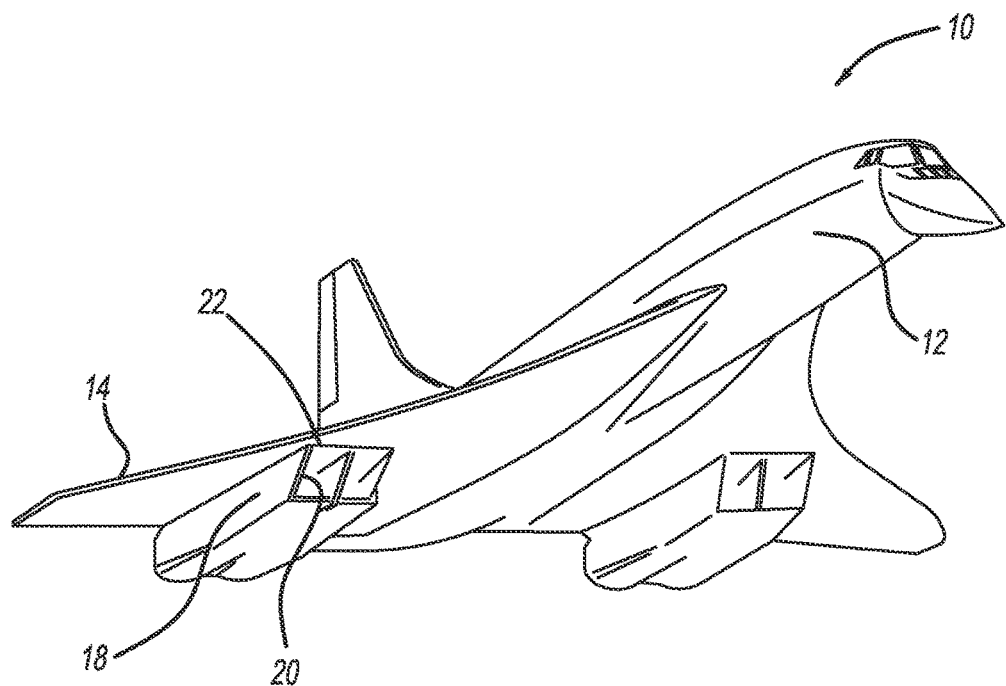
FIG. 1 is an isometric view of a Concorde supersonic aircraft including a slot air boundary layer diverter.

FIG. 1 is an isometric view of a Concorde supersonic aircraft 10 including a fuselage 12 and aircraft delta wings 14. The aircraft 10 includes four engines two on each side of the fuselage 12, and thus also includes a pair of engine air inlets 18 on each side of the fuselage 12. Each air inlet 18 includes a forward facing cowl 20 having a particular configuration and shape for providing air compression to reduce the speed of the air as it enters the inlet 18. Particularly, side walls of the cowl 20 are canted to create oblique flow shock waves to provide air compression and decelerate the airflow in a manner well understood by those skilled in the art. The air inlet 18 is positioned some distance from the wing 14 to create a slot 22 that acts as an air boundary layer diverter, where the air boundary layer traveling at the slower speeds proximate the wing 14 is directed through the slot 22 and not into the inlet 18 in a manner well understood by those skilled in the art.

Future supersonic aircraft will be required to operate at increased supersonic speeds, while still providing reduced aircraft drag, reduced weight, reduced complexity, etc. Such aircraft will likely require an improved air boundary layer diverter to provide the desired performance at speeds up to and greater than Mach 2.0. As will be discussed in detail below, the present invention proposes such an air boundary layer diverter that employs a swept gradient design to meet these requirements, and has been shown to be effective for high supersonic speeds up to and above Mach 2.0. However, it is noted that the swept gradient boundary layer diverter discussed herein will also have application for aircraft flying at sub-sonic speeds and hypersonic speeds, i.e., above Mach 4.

Figure 2:
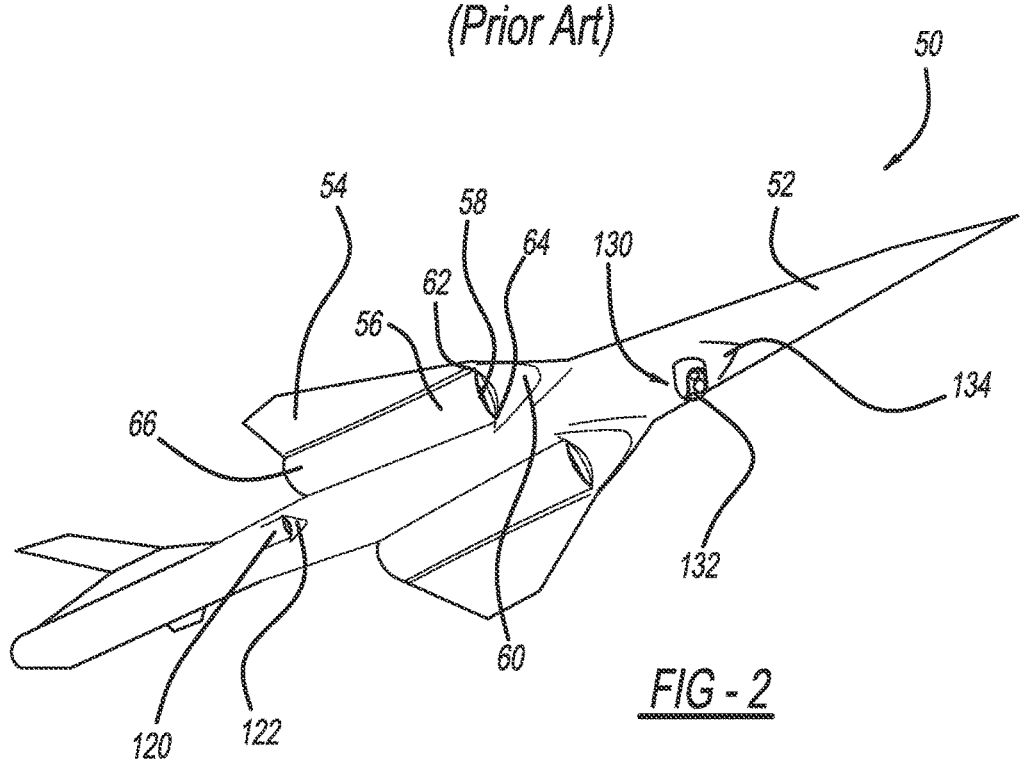
FIG. 2 is an isometric view of a possible design for a supersonic aircraft.

FIG. 2 is an isometric view of a conceptual supersonic aircraft 50 that is one possible design that performs at higher supersonic speeds than Mach 1.6. The aircraft 50 includes a fuselage 52 and wings 54. An air inlet 56 is provided on both sides of the fuselage 52 one for each engine 66 of the aircraft 50, and includes a specially configured inlet cowl 58, where the cowl 58 forms or integrates to the fuselage 52 at points 62 and 64. As will be discussed in detail below, the aircraft 50 includes a swept gradient air boundary layer diverter 60 positioned in front of the cowl 58, where the diverter 60 is a specially shaped indentation in the fuselage 52 of the aircraft 50 to provide boundary layer air diversion at very high aircraft speeds. Because the diverter 60 is slightly indented into the aircraft fuselage outer mold line (OML), it enables a lower profile primary inlet that reduces the inlet's contribution to the aircraft's total drag. The cowl 58 has a general semi-circular shape in this non-limiting design. However, it is noted that although the diverter 60 is described with reference to the aircraft 50 including the air inlet 56, the diverter 60 of the invention is applicable to be used on other types of aircraft having other shaped air inlets and cowls including above wing air inlets.

Figure 3:
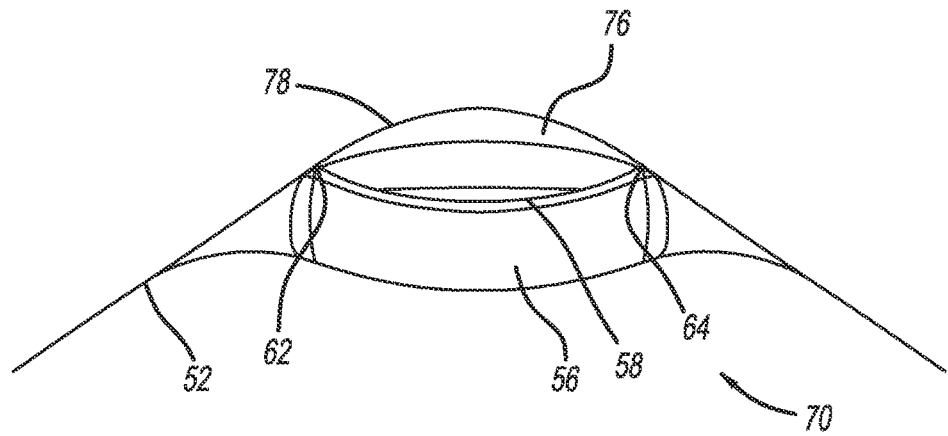
FIG. 3 is a front view of a section of the fuselage of the aircraft shown in FIG. 2 in front of one of the engine inlets including a swept gradient air boundary layer diverter.
Figure 4:
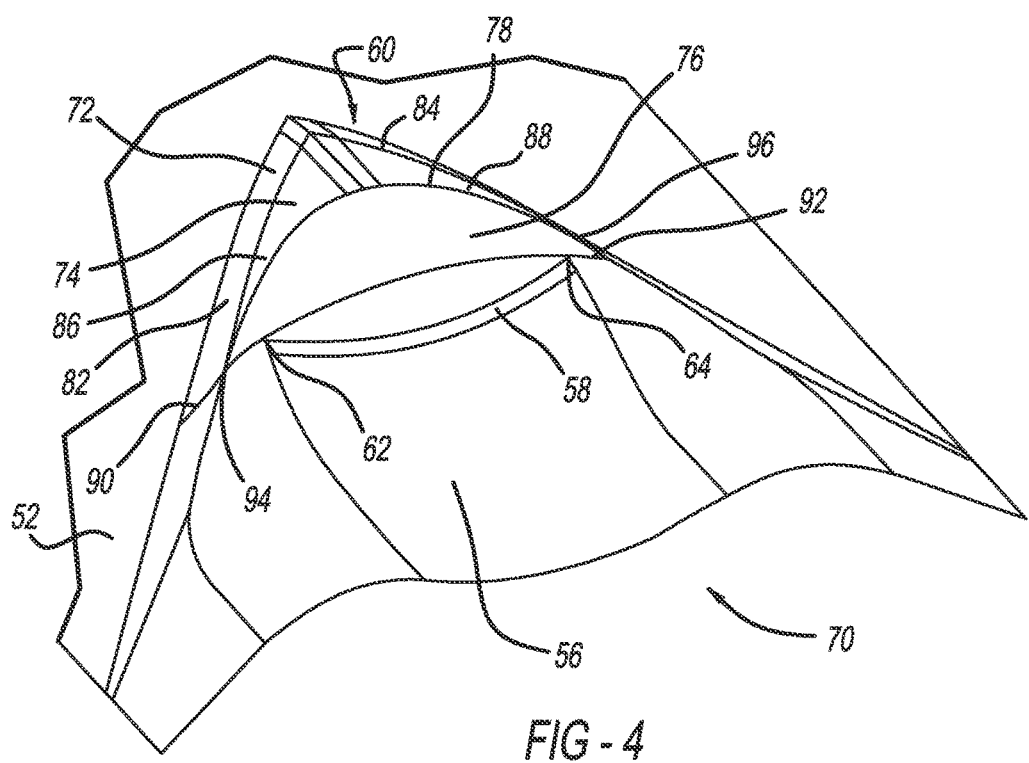
FIG. 4 is a front isometric view of the section of the aircraft shown in FIG. 3.
Figure 5:
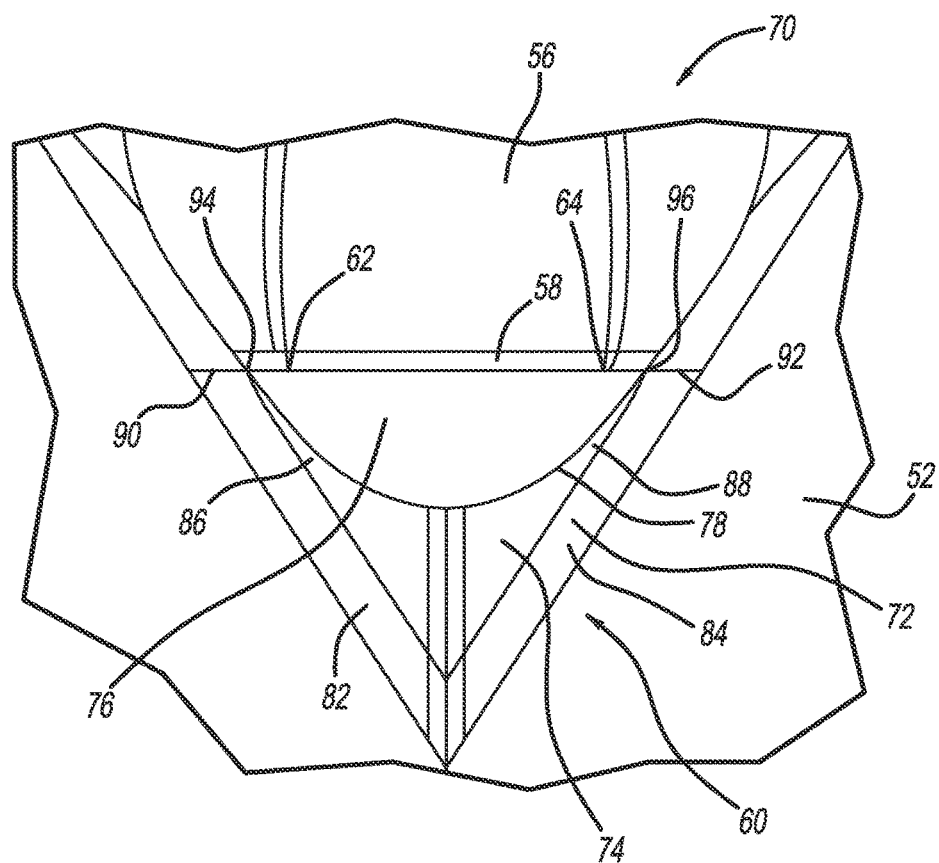
FIG. 5 is a top view of the section of the aircraft shown in FIG. 3.

FIG. 3 is a front view, FIG. 4 is an isometric view and FIG. 5 is a plan view showing a section 70 of the fuselage 52 of the aircraft 50 illustrating the swept gradient air boundary layer diverter 60. The section 70 includes a semi-circular compression surface 76 that slopes upwards at its sides and is provided directly in front of the cowl 58. The swept gradient diverter 60 is a general V-shaped indentation formed in the fuselage 52 and positioned in front of and around the compression surface 76, as shown. The diverter 60 includes an outer V-shaped swept expansion and compression ramp portion 72 and a V-shaped diverter trough portion 74. A compression surface leading edge 78 couples to the compression surface 76 at an end of the trough portion 74 opposite to the ramp portion 72. The ramp portion 72 is a narrow downwardly sloping surface extending from an outer surface of the fuselage 52 inward towards the inside of the aircraft 50. The trough portion 74 is an indentation in the fuselage 52 that is even with the lowest level of the ramp portion 72 and the compression surface 76. In this non-limiting design, side legs 82 and 84 of the ramp portion 72 are swept upward towards outer edges of the diverter 60, where the legs 82 and 84 end outside, but even with the cowl 58 at edges 90 and 92, respectively. Side portions 86 and 88 of the trough portion 74 are also flared upward towards outer edges of the diverter 60 to points 94 and 96, respectively.

As discussed above, in this non-limiting design, the side legs 82 and 84 of the ramp portion 72 and the side portions 86 and 88 of the trough portion 74 flare upwards. This is because of the shape of the fuselage 52 of the aircraft 50. However, the side legs 82 and 84 and the side portions 86 and 88 as discussed herein can be, for example, flat across their top surface for operation of the diverter.

When the boundary layer air flows along the fuselage 52 and encounters the swept gradient diverter 60 it will first turn and flow downward along the expansion and compression ramp portion 72, which will cause the airflow to expand and speed up. Once the airflow reaches the bottom edge of the ramp portion 72 and flows onto the trough portion 74 it is compressed, which acts to slow the airflow down and create oblique shock waves. This creates an expansion and compression wave creating a pressure gradient that generates vortices to redirect the airflow away from the cowl 58 of the inlet 56 along the legs 82 and 84 of the ramp portion 72 and the side portions 86 and 88 of the trough portion 74. Thus, the expansion and compression of the airflow created by the combination of the ramp portion 72 and the trough portion 74 operates to redirect the boundary layer air away from the inlet 56 by creating a pressure gradient in a diagonal direction relative to the original airflow that generates vortices to direct the boundary layer air away from the inlet 56.

Figure 6:
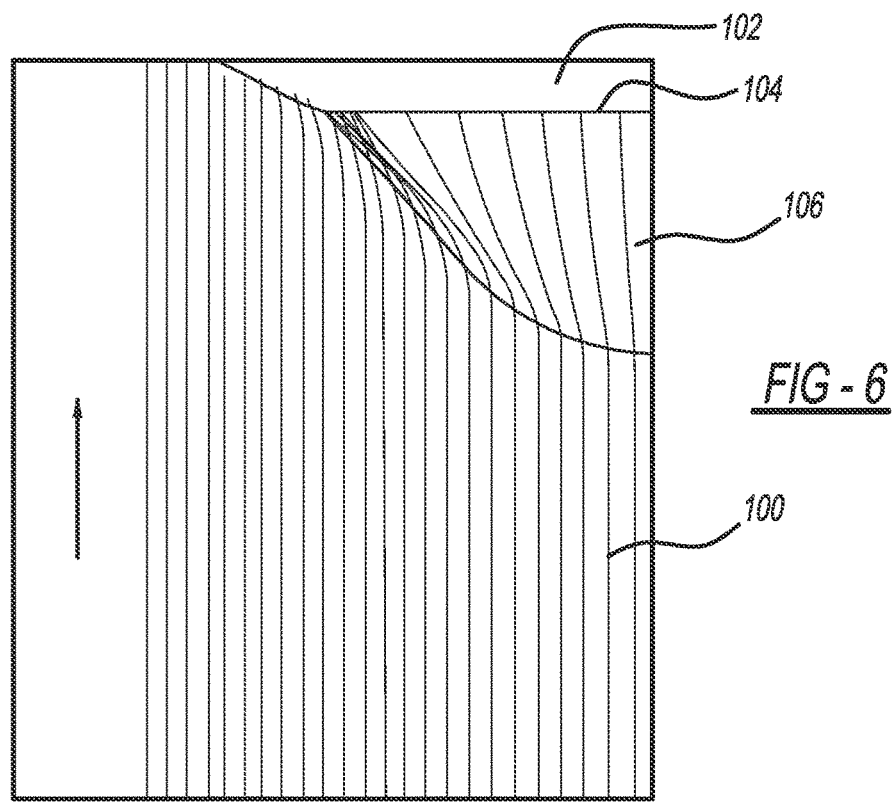
FIG. 6 is an airflow diagram showing airflow over an aircraft having no boundary layer diverter.
Figure 7:
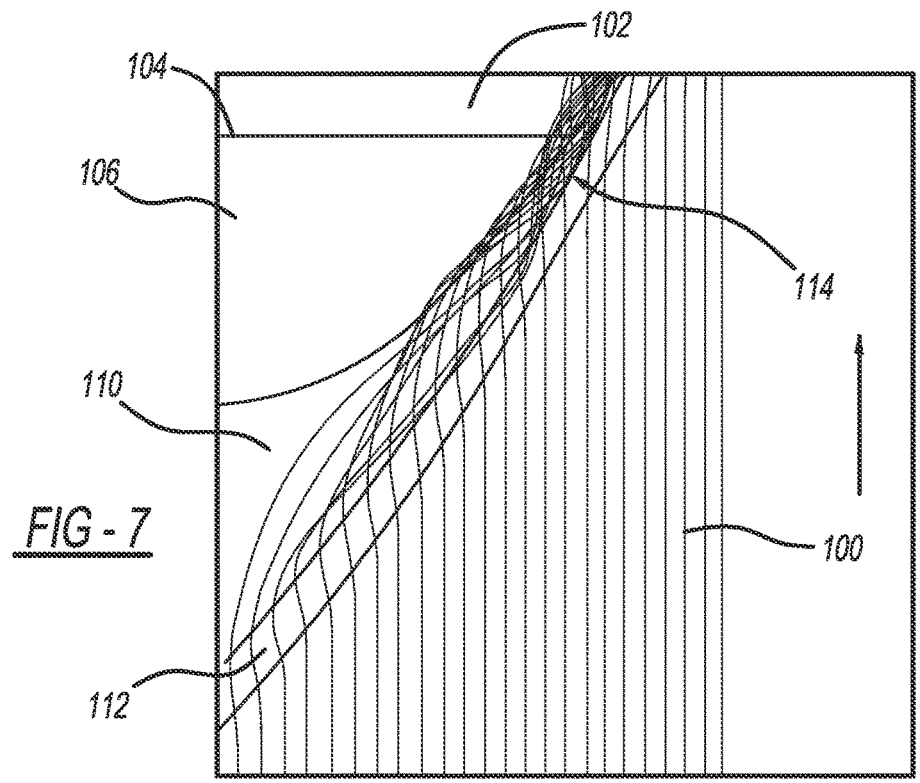
FIG. 7 is an airflow diagram showing airflow over the swept gradient air boundary layer diverter.

The flow of boundary layer air around the inlet 56 as described above caused by the swept gradient diverter 60 can be illustrated by FIGS. 6 and 7. FIG. 6 shows a plan view of the section 70 that does not include the diverter 60, where lines 100 represent the flow of air particles in front of and around the inlet 56. Area 102 represents the inlet 56, line 104 represents the cowl 58 and area 106 represents the compression surface 76. As is apparent in FIG. 7, there is some diversion of the airflow shown by flow lines 100 away from the inlet 56, but it is not significant.

FIG. 7 is a plan view of the section 70 including the swept gradient diverter 60, where area 110 represents the trough portion 74 and area 112 represents the ramp portion 72. As is apparent, the diverter 60 causes the airflow particle lines 100 to be directed away from and around the inlet 56 as a result of the V-shape of the depression created by the ramp portion 72 and the trough portion 74. The pressure gradients caused by the expansion and compression waves create air vortices represented by lines 114. The swept gradient diverter 60 creates pressure gradients that are strong enough to manipulate the low energy boundary layer flow close to the fuselage 52, but the higher energy flow at the very top of the boundary layer and in the free stream overcome these gradients and continue to move forward to be captured by the inlet 56.

The discussion above describes using the swept gradient diverter 60 to redirect boundary layer air around an engine air inlet on an aircraft. However, the swept gradient diverter 60 of the invention will have other applications. For example, aircraft and other vehicles may include an auxiliary air intake that provides secondary air for other aircraft systems, such as compartment cooling, component cooling, etc. Such aircraft systems may benefit from preventing boundary layer air from entering the auxiliary air intake, such as the ability to eliminate the need for a pump. The aircraft 50 in FIG. 2 shows an auxiliary air intake 120 positioned in the fuselage 52 as an example of the location where the auxiliary air intake could be. A swept gradient boundary air diverter 122 of the type discussed above is provided in front of the auxiliary air intake 120 to divert the boundary air layer around the intake 120.

Aircraft and other vehicles may also include various visual devices, such as a landing camera mounted, extending from the aircraft skin. Turbulent air around these devices may affect their visual requirements and performance. By providing a swept gradient air boundary layer diverter as discussed herein, the airflow may be redirected around the device, thus improving its performance. To illustrate this, the aircraft 50 includes a turret 130 that extends from the fuselage 52 and houses a visual device 132, such as a landing camera. A swept gradient boundary air diverter 134 of the type discussed above is provided in front of the turret 130 to divert the boundary air layer around the turret 130.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. An air boundary layer diverter for an aircraft, said aircraft including a fuselage and at least one engine air inlet for an engine of the aircraft, said engine air inlet including a shaped cowl at a leading edge of the engine air inlet defining an opening through which air flows to the engine, said diverter comprising:
   a ramp portion formed in the fuselage in an area proximate to and in front of the cowl where the ramp portion extends downward away from an outer surface of the fuselage towards an inside of the aircraft; and
   a trough portion formed in the fuselage and being positioned adjacent to and integral with the ramp portion between the ramp portion and the engine air inlet, wherein air flowing over the fuselage towards the cowl is expanded and compressed by the ramp portion and the trough portion so as to create pressure gradients that generate vortices to direct a boundary layer airflow away from and around the air inlet.

2. The diverter according to claim 1 wherein the trough portion is an indentation in the fuselage that is at the same level as a lowest edge of the ramp portion.

3. The diverter according to claim 1 wherein the ramp portion and the trough portion are both V-shaped portions.

4. The diverter according to claim 1 wherein side legs of the ramp portion and the trough portion are swept upwards from a central portion.

5. The diverter according to claim 4 wherein the side legs of the ramp portion and the trough portion have ends that are positioned in line with and outside of the cowl.

6. The diverter according to claim 1 wherein the ramp portion includes swept side legs that extend outside of the engine air inlet.

7. The diverter according to claim 1 wherein the fuselage includes a compression surface for reducing the speed of airflow into the inlet, said compression surface being between the trough portion and the cowl, and forming a compression surface leading edge with the trough portion.

8. The diverter according to claim 1 wherein the diverter is effective to prevent the air boundary layer from the entering the inlet at high supersonic speeds up to and above Mach 2.0.

9. The diverter according to claim 1 wherein the diverter is effective to redirect the air boundary layer around the inlet at sub-sonic, supersonic and hypersonic speeds.

10. An air boundary layer diverter for a vehicle having a vehicle body, said diverter comprising:
    a V-shaped ramp portion formed in the body where the ramp portion extends away from an outer surface of the body towards an inside of the vehicle; and
    a V-shaped trough portion formed in the body and being positioned adjacent to and integral with the ramp portion so that sides of the trough portion are integral with and align with legs of the V-shaped ramp portion, wherein air flowing over the body is expanded by the ramp portion and compressed by the trough portion so as to create pressure gradients that generate vortices to redirect a boundary layer airflow, wherein the V-shape of the ramp portion and the trough portion each has a point upstream relative to the airflow.

11. The diverter according to claim 10 wherein the trough portion is an indentation in the vehicle body that is at the same level as a lowest edge of the ramp portion.

12. The diverter according to claim 10 wherein side legs of the ramp portion and the trough portion are swept upwards from a central portion.

13. The diverter according to claim 10 wherein the vehicle is an aircraft including a fuselage and at least one air inlet, said diverter redirecting the boundary layer airflow away from and around the air inlet.

14. The diverter according to claim 13 wherein the air inlet is an inlet for an engine of the aircraft, said air inlet including a shaped cowl at a leading edge of the air inlet defining an opening through which air flows to the engine.

15. The diverter according to claim 13 wherein the air inlet is an auxiliary air inlet, said diverter redirecting the boundary layer airflow away from and around the auxiliary air inlet.

16. The diverter according to claim 10 wherein the vehicle includes at least one visual device, said diverter redirecting the boundary layer airflow away from and around the visual device.

17. The diverter according to claim 16 wherein the visual device is a landing camera.

18. An aircraft including a fuselage and at least one engine air inlet for an engine of the aircraft, said engine air inlet including a shaped cowl at a leading edge of the engine air inlet defining an opening through which air flows to the engine, said aircraft including a first air boundary layer diverter formed in the fuselage, said first air boundary layer diverter comprising:
    a ramp portion formed in the fuselage in an area proximate to and in front of the cowl where the ramp portion extends downward away from an outer surface of the fuselage towards an inside of the aircraft; and
    a trough portion formed in the fuselage and being positioned adjacent to and integral with the ramp portion between the ramp portion and the engine air inlet, wherein air flowing over the fuselage towards the cowl is expanded and compressed by the ramp portion and the trough portion so as to create pressure gradients that generate vortices to direct a boundary layer airflow away from and around the engine air inlet.

19. The aircraft according to claim 18 further comprising an auxiliary air inlet and a second air boundary layer diverter formed in the fuselage and positioned in front of the auxiliary air inlet, said second air boundary layer diverter comprising:
    a ramp portion formed in the fuselage in an area proximate to and in front of the cowl where the ramp portion extends downward away from an outer surface of the fuselage towards an inside of the aircraft; and
    a trough portion formed in the fuselage and being positioned adjacent to and integral with the ramp portion between the ramp portion and the engine air inlet, wherein air flowing over the fuselage towards the cowl is expanded and compressed by the ramp portion and the trough portion so as to create pressure gradients that generate vortices to direct a boundary layer airflow away from and around the auxiliary air inlet.

20. The aircraft according to claim 18 further comprising a visual device and a second air boundary layer diverter formed in the fuselage and positioned in front of the visual device, said second air boundary layer diverter comprising:
- a ramp portion formed in the fuselage in an area proximate to and in front of the device where the ramp portion extends downward away from an outer surface of the fuselage towards an inside of the aircraft; and
- a trough portion formed in the fuselage and being positioned adjacent to and integral with the ramp portion between the ramp portion and the engine air inlet, wherein air flowing over the fuselage towards the device is expanded and compressed by the ramp portion and the trough portion so as to create pressure gradients that generate vortices to direct a boundary layer airflow away from and around the device.

21. The aircraft according to claim 20 wherein the visual device is a landing camera.

22. The aircraft according to claim 18 wherein the trough portion is an indentation in the fuselage that is at the same level as a lowest edge of the ramp portion.

23. The aircraft according to claim 18 wherein the ramp portion and the trough portion are both V-shaped portions.

24. The aircraft according to claim 18 wherein side legs of the ramp portion and the trough portion are swept upwards from a central portion.

* * * * *